US008023513B2

(12) United States Patent
Chen et al.

(10) Patent No.: US 8,023,513 B2
(45) Date of Patent: Sep. 20, 2011

(54) SYSTEM AND METHOD FOR REDUCING OVERHEAD IN A WIRELESS NETWORK

(75) Inventors: Wei-Peng Chen, Fremont, CA (US); Chenxi Zhu, Gaithersburg, MD (US); Masato Okuda, Saitama (JP)

(73) Assignee: Fujitsu Limited, Kawasaki (JP)

( * ) Notice: Subject to any disclaimer, the term of this patent is extended or adjusted under 35 U.S.C. 154(b) by 199 days.

(21) Appl. No.: 12/391,760

(22) Filed: Feb. 24, 2009

(65) Prior Publication Data
US 2010/0214978 A1 Aug. 26, 2010

(51) Int. Cl.
H04L 12/28 (2006.01)
(52) U.S. Cl. ......... 370/393; 370/473; 370/474; 370/477
(58) Field of Classification Search .................. 370/230, 370/231, 229, 252, 310, 311, 324, 503, 509, 370/510, 511, 512, 513, 514, 393, 389, 238, 370/471, 474, 473, 477, 447, 468, 535; 375/211, 375/260, 308, 329, 240.27; 713/263, 168; 380/28, 29, 41, 270, 273, 283, 251, 278; 709/231, 239, 249; 714/777, 776, 778, 775, 714/799
See application file for complete search history.

(56) References Cited

U.S. PATENT DOCUMENTS

| | | | | |
|---|---|---|---|---|
| 4,748,619 A * | 5/1988 | Vigarie et al. | ................ | 370/349 |
| 5,757,913 A * | 5/1998 | Bellare et al. | ................ | 713/168 |
| 6,185,717 B1 * | 2/2001 | Fukunaga et al. | ............ | 714/777 |
| 6,240,140 B1 * | 5/2001 | Lindbergh et al. | ............ | 375/260 |
| 6,650,640 B1 * | 11/2003 | Muller et al. | ................ | 370/392 |
| 6,813,244 B1 * | 11/2004 | He et al. | ........................ | 370/235 |
| 7,046,627 B1 * | 5/2006 | Dejanovic et al. | ............ | 370/230 |
| 7,171,001 B2 * | 1/2007 | Tuvell et al. | ................... | 380/278 |
| 7,215,667 B1 | 5/2007 | Davis | .............................. | 370/389 |
| 7,358,899 B1 * | 4/2008 | Ville et al. | ..................... | 342/458 |
| 7,400,733 B1 * | 7/2008 | Cam-Winget et al. | ........ | 380/283 |
| 7,412,542 B1 * | 8/2008 | Newson et al. | ............... | 709/249 |
| 7,430,220 B2 * | 9/2008 | Cardona et al. | ............... | 370/465 |
| 7,490,145 B2 * | 2/2009 | Sylor et al. | ..................... | 709/224 |
| 2001/0030963 A1 * | 10/2001 | Yoshimura et al. | ........... | 370/393 |

(Continued)

OTHER PUBLICATIONS

Chen et al., *Reducing Data Encryption Overheads in Distributed Security Mode by Enabling Encryption in Relay MAC PDU*, IEEE C801.16j-08/040r3, Jan. 14, 2008.

(Continued)

*Primary Examiner* — Aung S Moe
*Assistant Examiner* — Abdullah Riyami
(74) *Attorney, Agent, or Firm* — Baker Botts L.L.P.

(57) ABSTRACT

A method for reducing overhead includes concatenating a plurality of packets into a single jumbo packet. Each packet of the plurality of packets comprises a header. The method also includes identifying a base header from among the plurality of headers. The method further includes determining a plurality of hamming distances that are each associated with a respective packet of the plurality of packets other than the base header and are indicative of a number of differences between the respective header and another header of the plurality of headers. The method further includes determining a plurality of encoded values that are each associated with a respective packet of the plurality of packets other than the base header and determined based on a difference between the respective header and at least one other header. The method additionally includes generating, and transmitting via a wireless connection, a jumbo header comprising the base header, the plurality of hamming distances, and the plurality of encoded values.

20 Claims, 3 Drawing Sheets

U.S. PATENT DOCUMENTS

| | | | | |
|---|---|---|---|---|
| 2002/0049838 | A1* | 4/2002 | Sylor et al. | 709/224 |
| 2002/0083193 | A1* | 6/2002 | Terefenko | 709/238 |
| 2003/0152162 | A1* | 8/2003 | Kojima | 375/295 |
| 2003/0153326 | A1* | 8/2003 | Jenzowsky et al. | 455/453 |
| 2003/0169769 | A1* | 9/2003 | Ho et al. | 370/473 |
| 2003/0214973 | A1* | 11/2003 | Duisenberg et al. | 370/474 |
| 2004/0039550 | A1* | 2/2004 | Myers | 702/186 |
| 2004/0039968 | A1* | 2/2004 | Hatonen et al. | 714/39 |
| 2004/0088406 | A1* | 5/2004 | Corley et al. | 709/224 |
| 2004/0103193 | A1* | 5/2004 | Pandya et al. | 709/224 |
| 2004/0114599 | A1* | 6/2004 | Yoon et al. | 370/395.1 |
| 2004/0123102 | A1* | 6/2004 | Gehrmann et al. | 713/161 |
| 2004/0181607 | A1* | 9/2004 | Xu et al. | 709/239 |
| 2004/0233846 | A1* | 11/2004 | Khandani et al. | 370/235 |
| 2005/0132062 | A1* | 6/2005 | Halme | 709/227 |
| 2005/0195750 | A1* | 9/2005 | Le et al. | 370/252 |
| 2006/0018269 | A1* | 1/2006 | Agrawal et al. | 370/321 |
| 2006/0050869 | A1* | 3/2006 | Tuvell et al. | 380/28 |
| 2006/0153089 | A1* | 7/2006 | Silverman | 370/252 |
| 2006/0212556 | A1* | 9/2006 | Yacoby et al. | 709/223 |
| 2006/0245505 | A1* | 11/2006 | Limberg | 375/240.27 |
| 2006/0256786 | A1* | 11/2006 | Bibr et al. | 370/389 |
| 2006/0259984 | A1* | 11/2006 | Juneau | 726/28 |
| 2007/0014237 | A1* | 1/2007 | Nishibayashi et al. | 370/229 |
| 2007/0112972 | A1* | 5/2007 | Yonge et al. | 709/231 |
| 2007/0171829 | A1* | 7/2007 | Kojima | 370/252 |
| 2007/0186282 | A1* | 8/2007 | Jenkins | 726/22 |
| 2007/0211764 | A1* | 9/2007 | Fujita et al. | 370/498 |
| 2007/0248075 | A1* | 10/2007 | Liu et al. | 370/349 |
| 2007/0297420 | A1* | 12/2007 | Holmgren et al. | 370/397 |
| 2008/0016115 | A1* | 1/2008 | Bahl et al. | 707/104.1 |
| 2008/0120728 | A1* | 5/2008 | Jiang | 726/30 |
| 2008/0130580 | A1* | 6/2008 | Chaponniere et al. | 370/331 |
| 2008/0165713 | A1* | 7/2008 | Nishibayashi et al. | 370/310 |
| 2008/0165968 | A1* | 7/2008 | Yadav et al. | 380/270 |
| 2008/0175265 | A1* | 7/2008 | Yonge et al. | 370/447 |
| 2008/0228914 | A1* | 9/2008 | Ofel et al. | 709/224 |
| 2008/0262798 | A1* | 10/2008 | Kim et al. | 702/189 |
| 2008/0304432 | A1* | 12/2008 | Lee et al. | 370/311 |
| 2009/0016351 | A1* | 1/2009 | Patel et al. | 370/392 |
| 2009/0060009 | A1* | 3/2009 | Qian et al. | 375/211 |
| 2009/0067336 | A1* | 3/2009 | Cho et al. | 370/238 |
| 2009/0154454 | A1* | 6/2009 | Wittenschlaeger | 370/389 |
| 2009/0180451 | A1* | 7/2009 | Alpert et al. | 370/338 |
| 2009/0201948 | A1* | 8/2009 | Patwardhan et al. | 370/474 |
| 2009/0219919 | A1* | 9/2009 | Li | 370/351 |
| 2009/0245252 | A1* | 10/2009 | Konishi et al. | 370/390 |
| 2009/0245260 | A1* | 10/2009 | Mohaban et al. | 370/392 |
| 2009/0248830 | A1* | 10/2009 | Kodama et al. | 709/212 |
| 2010/0031124 | A1* | 2/2010 | Shinagawa et al. | 714/777 |
| 2010/0098254 | A1* | 4/2010 | Chowdhary et al. | 380/270 |
| 2010/0118893 | A1* | 5/2010 | Lee et al. | 370/474 |
| 2010/0128762 | A1* | 5/2010 | Nabetani et al. | 375/219 |
| 2010/0165840 | A1* | 7/2010 | Khan et al. | 370/232 |
| 2010/0177789 | A1* | 7/2010 | Chen et al. | 370/477 |
| 2010/0254387 | A1* | 10/2010 | Trinh et al. | 370/392 |

OTHER PUBLICATIONS

Brower et al., *Integrating Header Compression with IPSEC*, MILCOM 2006.

Ertekin et al., *Integration of Robust Header Compression (ROHC) OVER ipSEC Security Associations*, draft-ietf-rohc-hcoipsec-07.txt, http://www.ietf org/internet-drafts/draft-ietf-rohc-hcoipsec-07.txt, 2007, 12/37/2007.

Chen et al., U.S. Appl. No. 12/352,887, filed Jan. 13, 2009, *Device and Method for Reducing Overhead in a Wireless Network*.

* cited by examiner

SYSTEM AND METHOD FOR REDUCING OVERHEAD IN A WIRELESS NETWORK

TECHNICAL FIELD

This invention relates in general to wireless networking and more particularly, to a system and method for reducing overhead in a wireless network.

BACKGROUND

Wireless radio frequency spectrum is a precious and scarce resource for wireless operators in any wireless system. Accordingly, efficient usage of the spectrum is always desired for wireless operators. In particular, Medium Access Control (MAC) overhead efficiency is a key factor to achieve spectrum efficiency. MAC overhead in wireless systems includes packet headers, control and management packets, security context, message authentication code, etc. Reducing MAC overheads as much as possible can significantly improve MAC efficiency and thus conserve wireless resources.

SUMMARY

In accordance with particular embodiments, a method for reducing overhead includes concatenating a plurality of packets into a single jumbo packet. Each packet of the plurality of packets comprises a header. The method also includes identifying a base header from among the plurality of headers. The method further includes determining a plurality of hamming distances. Each hamming distance is associated with a respective packet of the plurality of packets other than the base header. The hamming distance is indicative of a number of differences between the respective header and another header of the plurality of headers. The method further includes determining a plurality of encoded values. Each encoded value is associated with a respective packet of the plurality of packets other than the base header and determined based on a difference between the respective header and at least one other header. The method additionally includes generating a jumbo header comprising the base header, the plurality of hamming distances, and the plurality of encoded values. The method also includes transmitting the jumbo packet with the jumbo header via a wireless connection.

In accordance with some embodiments, a method for reducing overhead includes receiving, via a wireless connection, a jumbo packet comprising a jumbo header and a plurality of concatenated packets. The method also includes identifying within the jumbo header, a base header associated with one packet of the plurality of packets and at least one hamming distance and at least one encoded value associated with each packet of the plurality of packets other than the identified packet. The method additionally includes recreating a plurality of headers associated with the plurality of packets based on the base header and the respective hamming distance and encoded value.

Technical advantages of particular embodiments may include providing a reduction in the amount of header overhead involved in communicating packets in a wireless network. The reduction may be achieved while still allowing the recipient to receive all of the information in the original header. Accordingly, the wireless network's resources are more efficiently used.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments and their advantages, reference is now made to the following description, taken in conjunction with the accompanying drawings, in which.

DETAILED DESCRIPTION

Figure 1:
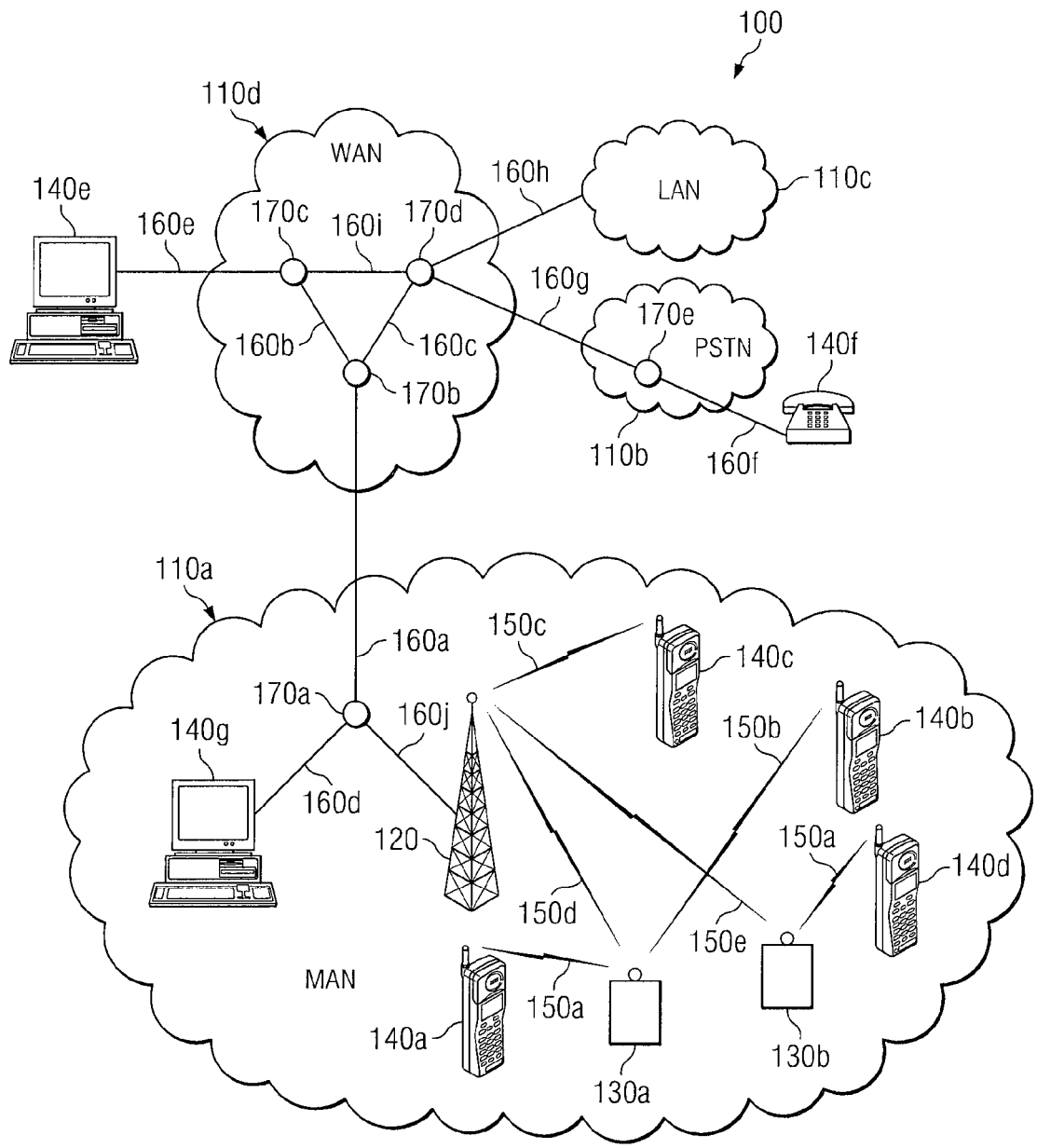
FIG. 1 illustrates a communication system comprising various communication networks, in accordance with particular embodiments.

FIG. 1 illustrates a communication system comprising various communication networks, in accordance with particular embodiments. Communication system 100 may be comprised of multiple interconnected networks 110. Each network 110 may be any of a variety of communication networks designed to facilitate one or more different services either independently or in conjunction with other networks. For example, networks 110 may facilitate internet access, online gaming, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110a may comprise an 802.16 wireless network (e.g., 802.16j or 802.16m), popularly known as WiMAX, which may include base stations, such as base station 120, and relay stations, such as relay stations 130. Network 110a may provide for the use of relay stations 130 by implementing 802.16j. A WiMAX network that uses relay stations may be referred to as a mobile multi-hop relay (MMR) network.

Within a network using a wireless protocol (e.g., 802.16m), such as network 110a, communications between components may be done with packets. Besides the data to be communicated, these packets may include MAC overhead. The overhead may include headers containing information related to the packet (e.g., the source, the destination, the size of the payload, etc.) as well as security information (e.g., message authentication code, security context, etc.). This information can create significant overhead because it is contained in each packet but does not directly contribute to the communication of actual desired data or information. While the information may cause overhead, it may be needed to provide the packets with integrity protection and encryption from potential security attacks and eavesdropping. In particular embodiments, the overhead may be reduced by concatenating two or more packets into a single jumbo packet and then compressing the header and/or reducing the amount of security information used for the concatenated packets.

The packets (and jumbo packets) may be communicated between components of wireless network 110a via wireless links. More specifically, between each endpoint, relay station and/or base station there may be a wireless connection or link, such as wireless connections 150. Wireless connections 150 may each comprise their own various wireless resources such as, for example, a combination of a particular center frequency, a particular bandwidth, a particular time slot, and/or a particular subchannel (for example, as described in a downlink or uplink map). The actual properties of a particular wireless connection 150 may depend on the communication standard used (e.g., WiMAX).

In wireless network 110a, MAC overhead may include packet headers, control and management packets, security information, etc. For simplicity, the term security information may be used as a general term for the mechanism or mechanisms that may be employed to protect (e.g., authentication) a packet payload. For example, in 802.16 systems, Ciphertext message authentication code (CMAC) values for data packets or CMAC tuples/CMAC digests for MAC management messages may be considered as security information. Another example of the security information is the authentication header in IPSec.

Although communication system 100 includes four different networks, networks 110a-110d, the term "network" should be interpreted as generally defining any network or combination of networks capable of transmitting signals, data, and/or messages, including signals, data or messages transmitted through WebPages, e-mail, text chat, voice over IP (VoIP), and instant messaging. Depending on the scope, size and/or configuration of the network, any one of networks 110a-110d may be implemented as a LAN, WAN, MAN, PSTN, WiMAX network, globally distributed network such as the Internet, Intranet, Extranet, or any other form of wireless or wired networking. For purposes of illustration and simplicity, network 110a is a MAN that may be implemented, at least in part, via WiMAX, network 110b is a PSTN, network 110c is a LAN, and network 110d is a WAN.

In the depicted embodiment, networks 110a, 110c and 110d may be IP networks. IP networks transmit data by placing the data in packets and sending each packet individually to the selected destination, along one or more communication paths. Network 110b may, for example, be a PSTN that may include switching stations, central offices, mobile telephone switching offices, pager switching offices, remote terminals, and other related telecommunications equipment that are located throughout the world. Network 110d may be coupled to network 110b through a gateway. Depending on the embodiment, the gateway may be a part of network 110b or 110d (e.g., nodes 170e or 170c may comprise a gateway). The gateway may allow PSTN 110b to be able to communicate with non-PSTN networks such as networks 110a, 110c and 110d.

Networks 110 may be connected to each other and with other networks via a plurality of wired links 160, wireless connections 150, and nodes 170. Not only do the wired links 160, wireless connections 150, and nodes 170 connect various networks but they also interconnect endpoints 140 with one another and with any other components coupled to or a part of any of networks 110. The interconnection of networks 110a-110d may enable endpoints 140 to communicate data and control signaling between each other as well as allowing any intermediary components or devices to communicate data and control signals. Accordingly, users of endpoints 140, may be able to send and receive data and control signals between and among each network component coupled to one or more of networks 110a-110d.

Nodes 170 may include any combination of network components, session border controllers, gatekeepers, base stations, conference bridges, routers, hubs, switches, gateways, endpoints, or any other hardware, software, or embedded logic implementing any number of communication protocols that allow for the exchange of packets in communication system 100. For example, node 170e may comprise a gateway. Node 170e, as a gateway, may translate communications between the various protocols used by different networks.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140a-140d may include a cell phone, an IP telephone, a computer, a video monitor, a camera, a personal data assistant or any other hardware, embedded software and/or encoded logic that supports the communication of packets (or frames) using networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or arrangement of such components for communicating data. In addition, elements of communication system 100 may include components centrally located (local) with respect to one another or distributed throughout communication system 100.

Figure 2:
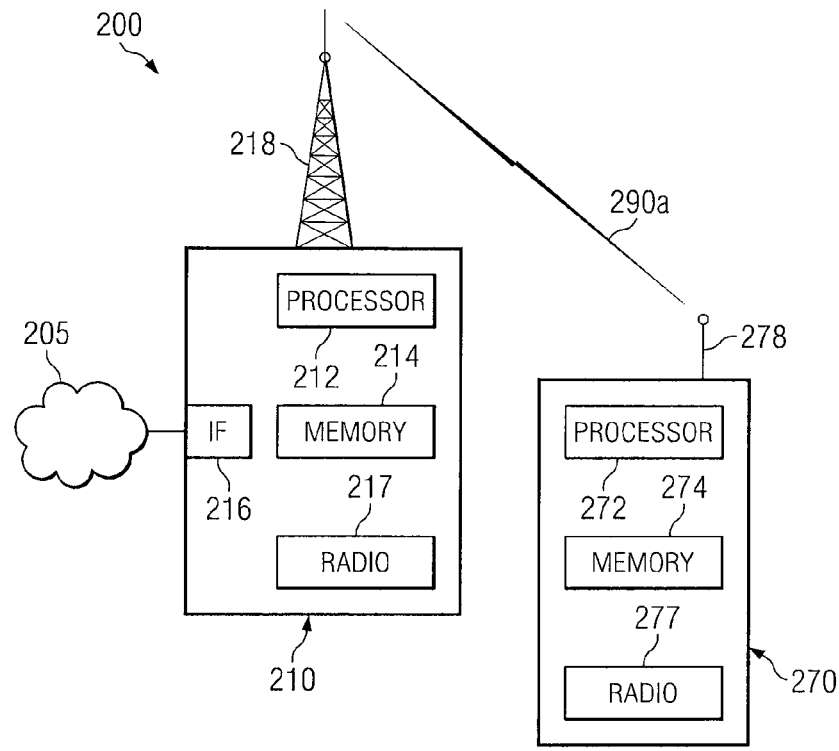
FIG. 2 illustrates a wireless network comprising a more detailed view of an endpoint and a base station, in accordance with particular embodiments.

FIG. 2 illustrates a wireless network comprising a more detailed view of an endpoint and a base station, in accordance with particular embodiments. The depicted embodiment is a simplified network comprising IP network 205, base station 210, and endpoint 270. In different embodiments network 200 may comprise any number of wired or wireless networks, base stations, endpoints, and/or any other components (e.g., relay stations) that may facilitate or participate in the communication of data and/or signals whether via wired or wireless connections.

In the depicted embodiment, base station 210 comprises processor 212, memory 214, interface 216, radio 217 and antenna 218. Similarly, endpoint 270 comprises processor 272, memory module 274, radio 277, and antenna 278. These components may work together in order to provide wireless networking functionality, such as communicating packets using less overhead than a traditional wireless network.

Looking at the various components of network 200 in more detail, IP network 205 may comprise one or more of the networks 110 described above with respect to FIG. 1. For example, IP network 205 may comprise the Internet, a LAN, WAN, MAN, PSTN or some combination of the above.

For convenience, similar components of base station 210 and endpoint 270 will be discussed together where appropriate. Processors 212 and 272 may be microprocessors, controllers, or any other suitable computing devices, resources, or combinations of hardware, embedded software and/or encoded logic operable to provide, either alone or in conjunction with other components (e.g., memory 214 and/or 274), wireless networking functionality. Such functionality may include providing various wireless features discussed herein. For example, processors 212 and 272 may be able to determine which packets to concatenate, and how to compress the headers and reduce the amount of security information. Additional examples and functionality provided, at least in part, by processors 212 and 272 will be discussed below.

Memory modules 214 and 274 may be any form of volatile or non-volatile memory including, without limitation, magnetic media, optical media, random access memory (RAM), read-only memory (ROM), flash memory, removable media, or any other suitable local or remote memory component or components. Memory modules 214 and 274 may store any suitable data or information utilized by base station 210 and endpoint 270, respectively, including software embedded in a computer readable medium, and/or encoded logic incorporated in hardware or otherwise stored (e.g., firmware). For example, in particular embodiments memory modules 214 and 274 may store information regarding the cipher used as security for packets communicated between base station 210 and endpoint 270. Memory modules 214 and 274 may also maintain a list, database, or other organization of data useful for determining how to route data to the proper component.

Radios 217 and 277 may be coupled to or a part of antennas 218 and 278, respectively. Radios 217 and 277 may receive digital data that is to be sent out to other base stations, relay stations and/or endpoints via a wireless connection. Radios 217 and 277 may convert the digital data into a radio signal having the appropriate center frequency and bandwidth parameters. These parameters may have been determined ahead of time, for example by a combination of processor 212 and memory 214 of base station 210. The radio signal may then be transmitted via antennas 218 and 278 to the appropriate recipient. Similarly, radios 217 and 277 may convert radio signals received via antennas 218 and 278, respectively, into digital data to be processed by processors 212 or 272, as appropriate. Together, radio 217 and antenna 218, and radio 277 and antenna 278 may each form a wireless interface.

Base station 210 also comprises interface 216 which may be used for the wired communication of signaling and/or data between base station 210 and network 205. For example, interface 216 may perform any formatting or translating that may be needed to allow base station 210 to send and receive data from network 205 over a wired connection. While not depicted, endpoint 270 may also include wired interfaces.

Endpoint 270 may be any type of wireless endpoint able to send and receive data and/or signals to and from base station 210. Some possible types of endpoints 270 may include desktop computers, PDAs, cell phones, laptops, and/or VoIP phones.

As alluded to above, the components of base station 210 and endpoint 270 may work to reduce the amount of overhead within network 200. More specifically, base station 210 and endpoint 270 may communicate using jumbo packets that include two or more concatenated packets, a compressed header and/or reduced security information. The use of jumbo packets may reduce the amount of overhead compared to using individual, non-concatenated packets.

It may be assumed that communications between base station 210 and endpoint 270 are transmitted via packets. Initially, each packet may include one MAC header. In addition, it may be desired that the packets include security information (e.g., the packet is protected with a security algorithm). The inclusion of both a header and security information with each packet may occur even when the packet is disseminated through a security tunnel or over a single link. For convenience, it will be assumed that base station 210 is the transmitter and endpoint 270 is the receiver. In practice, any endpoint, base station or relay station (not depicted), may be a transmitter or receiver, as the case may be. Accordingly, with respect to creating, encoding, encrypting, transmitting, receiving, decrypting and decoding jumbo packets, the functionality and/or components described below may be applied to any base station, relay station or endpoint. The amount of overhead associated with the transmission of packets may be reduced by processor 212 applying header compression and sharing the security information with a set of concatenated packets before transmitting them via radio 210 and antennae 218.

Depending on the scenario, jumbo packets may, for example, be used to transmit multiple packets to the same component over a single link. As another example, jumbo packets may be transmitted via a secure tunnel spanning one or more links. Regardless of the situation, processor 212 may concatenate the two or more packets and then perform header compression and/or reduce the amount of security information. More specifically, with respect to header compression, each packet may start with its own header. Processor 212 may then search for and remove redundancies in the headers of the concatenated packets. With respect to security information reduction, those packets of the concatenated packets that would have had the same or similar security information had they been sent separately, may share the same security information from the jumbo packet. Both of these reduction techniques will be described in more detail below.

In order for the recipient of a jumbo packet to be able to decipher the contents it may need to know how the information is organized within the concatenated packet. Accordingly, before processor 212 applies any header compression methods or shares any security information from the jumbo packet, base station 210 and endpoint 270 (e.g., the transmitter and the receiver) may exchange information and agree on the settings and details of the compression algorithms. This may include selecting among different types of compression algorithms, rules of exclusions, etc. In the context of 802.16, this information may be communicated in the format of type-length-values (TLVs) in the dynamic service addition request/response (DSA-REQ/RSP) messages exchange. In some instance, a dynamic service change request/response (DSC-REQ/RSP) message exchange may be used to change compression settings.

Figure 3:
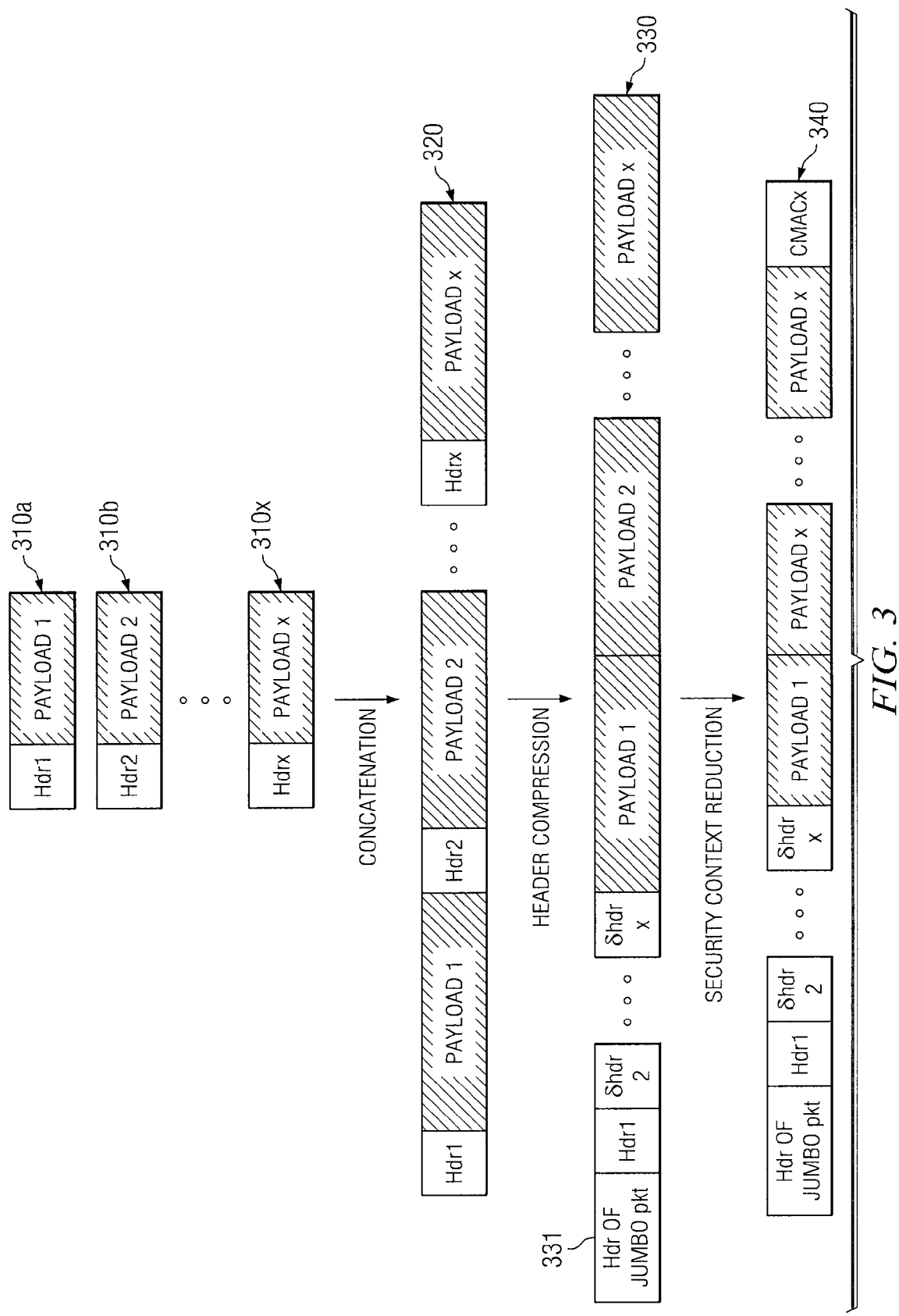
FIG. 3 illustrates the concatenation of several packets into a single jumbo packet having less overhead than the original packets, in accordance with particular embodiments.

The use of both header compression and security information reduction can be seen in FIG. 3. More specifically, packets 310 may represent multiple packets to be sent to endpoint 270. Packets 310 may then be concatenated into a single packet 320. Next, header compression may be applied to remove redundancy in the headers of the multiple packets as shown in jumbo packet 330. Then, any encryption, authentication, or other security measures that would be applied the individual packets (if sent alone) may be applied to jumbo packet 340 such that only one set of security information (e.g., CMAC value shown in FIG. 3) may be used for all the concatenated packets.

Particular embodiments may generate a new set of headers for each of the concatenated packets in the single packet 320 that uses fewer bits than were used by the original set of headers. In particular embodiments, this may be achieved by using one header as a base header and encoding the rest of the headers by the respective differences with respect to the base header or a previous header. For example, the first header may be the base header, the second header may be represented by a delta header (e.g., dhdr2) comprising differences between the first header and the second header, the third header may be represented by its own delta header (e.g., dhdr3) comprising differences between the third header and the second header, or between the third header and the first header.

In particular embodiments, the differences between two headers may be determined by processor 212 using an 'exclusive or' (XOR, $\oplus$) operation on each bit of the bit strings for the two headers. Using this operation, a new bit string may be created that comprises a '0' each time the two bits are the same, and a '1' each time the two bits are different. For convenience, the resulting string of the $\oplus$ operation may be referred to as a delta header. The number of different bits between the two binary strings (e.g., those that result in a '1') may be called the hamming distance.

Using the known hamming distance between two original headers along with the length of the respective headers (e.g., the number of bits per header), it may be possible to determine the number of possible delta headers. More specifically, if the hamming distance between header one (Hdr1) and header 2 (Hdr2) is equal to 'm', and the two headers each comprise 'n' bits, then it may be determined that 'm' out of 'n' bits of Hdr2 are different from those in Hdr1. It may further be determined that there are C(n;m) combinations to select which 'm' bits are different. Then, if Hdr1 is used as the base header, then there are C(n;m) possibilities for Hdr2. The differences between Hdr1 and Hdr2 may be encoded using k bits, wherein k=ceil(log$_2$C(n;m)), wherein 'ceil' is a ceiling function which maps a real number to the next higher integer.

This may best be seen by an example. Assume the two original headers Hdr1 and Hdr2, each have a length of 4 bits, wherein Hdr1=(1, 0, 0, 0) and Hdr2=(1, 0, 1, 1). The difference between the two headers, delta header 2, denoted as dhdr2, would be dhdr2=(0, 0, 1, 1) because the first two bits of Hdr1 and Hdr2 are the same and the second two bits are different. From dhdr2, processor 212 may determine the hamming distance is two because there are two different bits. Because two of the four bits of Hdr2 are different than Hdr1, both processor 212 to encode the delta header, and processor 272 to decode the delta header.

The encoding algorithm may use the delta header, and the hamming distance of the two original headers to determine the encoding. In particular embodiments, the bits in the delta header may be numbered from the least significant bit (LSB) starting from 0 to the most significant bit (MSB) ending at n−1. In certain embodiments, the encoding algorithm may use the following formula related to Binomial coefficients: C(n;m)=C(n−1;m−1)+C(n−1;m). In other words, the left hand side represents the total number of possible combinations of 'm' bits out of 'n' bits being '1'. The right hand side includes two sub-cases: the first term represents the number of combinations with a first bit equal to '1' while the second term is the number of combinations with the first bit equal to '0'. In particular embodiments, the encoding may begin by encoding as '0' the delta header with 'm' LSBs equal to '1'. Then, the most significant bit of '1' may be moved to the left, each move left increases the encoded value by one until the MSB reaches the left end. Then, two of the MSBs are moved to the left from their original position (all at the right side). The operations continue iteratively until all 'm' MSBs are equal to '1' (e.g., all the '1s' are at the left side). The case when n=5 and m=3 is shown in the table below:

| delta header | Bit 4 | Bit 3 | Bit 2 | Bit 1 | Bit 0 | encode value |
|---|---|---|---|---|---|---|
| 00111 | 0 | 0 | 0 | 0 | 0 | 0 |
| 01011 | 0 | 0 | C(5-3; 3-3) | 0 | 0 | 1 |
| 10011 | 0 | C(5-4; 3-3) | C(5-3; 3-3) | 0 | 0 | 2 |
| 01101 | 0 | 0 | 0 | C(5-2; 3-2) | 0 | 3 |
| 10101 | 0 | C(5-4; 3-3) | 0 | C(5-2; 3-2) | 0 | 4 |
| 11001 | 0 | 0 | C(5-3; 3-2) | C(5-2; 3-2) | 0 | 5 |
| 01110 | 0 | 0 | 0 | 0 | C(5-1; 3-1) | 6 |
| 10110 | 0 | C(5-4; 3-3) | 0 | 0 | C(5-1; 3-1) | 7 |
| 11010 | 0 | 0 | C(5-3; 3-2) | 0 | C(5-1; 3-1) | 8 |
| 11100 | 0 | 0 | 0 | C(5-2; 3-1) | C(5-1; 3-1) | 9 | there are six possible arrangements for the bits of dhdr2 (0: (0, 0, 1, 1), 1: (0, 1, 0, 1), 2: (1, 0, 0, 1), 3: (0, 1, 1, 0), 4: (1, 0, 1, 0), 5: (1, 1, 0, 0)). Processor 212 may be able to encode these six possibilities using three bits. Thus, for our example because dhdr2=(0, 0, 1, 1) processor 212 would use the first option (0) and the encoded value of dhdr2 would be '000'. Hdr1, the hamming distance value, two, and the encoded value '000' may then be used by processor 272 to reconstruct Hdr2.

While the previous example resulted in using 5 bits (2 bits for the hamming distance value and 3 bits for the encoding of dhdr2) to compress Hdr2 (which is larger than the original 4 bits of Hdr2), headers comprising increased length may experience increased benefits from the compression. For example, when the length of the headers' bit string equals 40 and the hamming distance value is 8, then only 27 bits would be needed to encode the possible combinations of dhdr2 and 6 bits to represent the hamming distance value. Thus, Hdr2 may be compressed from 40 bits to 33 (27+6) bits. In particular embodiments, processor 212 may determine whether compressing the headers actually lowers the number of bits required before it actually performs the compression.

As mentioned above, part of the compression relies on encoding the delta header (e.g., dhdr2) using one of several possible combinations. In some embodiments, all the possible combinations may be stored in memory of each component of the network (e.g., memory 214 and memory 274). In particular embodiments, an algorithm may be used to allow The left most column is the delta header and the right most column is the encoded value.

The values in each column for Bits 0-4 are the values which contribute part of the entire encoding value. The encoding principles to decide the contributed value for one bit are:
Start computing the encoding value from the LSB (i.e. right most bit).
Assign 0 to the value of the bit equal to '1'.
Assign the value C(n−i−1; m−c−1) to the i-th LSB bit when its value is equal to 0, wherein c is the number of accumulative bits with values equal to '1' counting from the right most bit to the i-th LSB.

For example, for delta header '10011' the value of Bit 2 is C(5−2−1; 3−2−1), which is equal to '1' and the value of the Bit 3 is C(5−3−1; 3−2−1), which is equal to '1'. Thus, the encode value is the sum of these two values, which is equal to two.

In particular embodiments, processor 212 may encode the delta header using a while loop. For example, the following while loop may output an encoded value (val):

```
1.    c = 0, val = 0, i = 0;
2.    while (c < m) {
3.        if (d[i] == 1)    c ++;
4.        else      val += C(n−i−1; m−c−1);
5.        i++;}
6.    return val;
``` wherein d[i] is the ith bit of the delta header (determined by the XOR operation of two headers) having 'n' bits and a hamming distance of 'm'.

Similarly, when endpoint 270 receives the bit string length (n), the hamming distance (m), and the encoded value (val), it may be possible for processor 272 to use the following loops to determine the original delta header:

```
1.   c = 0, i = 0;
2.   while (val > 0) {
3.           if (val ≦ C(n−i−1; m−c−1) ) {
4.                   d[i]=1; c ++;}
5.           else    {
6.                   d[i]=0; val −= C(n−i−1; m−c−1);}
7.           i++;}
8.   while (c ≦ m)     {
9.           d[i]=1; c++; i++;}
10.  for (j=i; j < n; j++)      d[j]=0;
11.  return d;
```

After decoding the encoded value of the delta header, endpoint 270 may be able to easily decompress the headers by applying XOR operations to the base header and the delta header.

The same techniques used in compressing two headers may be applied to multiple headers. More specifically, one of the headers may be chosen as the base header, then the next header may be encoded based on the differences between the second header and the base header. Subsequent headers may then be based on differences with either the original base header or one of the other previous headers.

When compressing headers, it may be desirable to use as few bits as possible to encode the delta header. Accordingly, it may be desirable to find the shortest spanning path (e.g., the shortest Hamiltonian path) or the minimum spanning tree for encoding the multiple delta bit strings. Accordingly, the base header may be selected from among the multiple headers using any of a variety of different techniques and/or strategies that provide the shortest path or minimum spanning tree. For example, techniques such as a single path approach, a star topology approach, or a tree topology approach may be used.

The single path approach may involve compressing multiple headers wherein each header (after the first base header) is encoded based on its previous header. When using such an approach, it may be desirable to find the shortest Hamiltonian path to cover all the headers. On possible way to approximate a solution may be to find a spanning path. The first header may then be considered as the base header, denoted as Hdr1. In order for the receiver to decompress all the headers, the transmitter may include in the encoding sequence the following information: x, HD2, HD3, . . . , HDx, Hdr1, En2, En3, . . . , Enx (x is the number of the headers; HDx is the hamming distance for Hdrx; and Enx is the encoded value for dhdrx where dhdrx=Hdrx⊕Hdrx−1). Upon reception of the encoding sequence, endpoint 270 may decompress all the headers sequentially starting from the base header, Hdr1, which may be recovered as intact. Eventually, endpoint 270 may decompress Hdrx after first reconstructing Hdrx−1, then decoding Enx to obtain dhdrx, the differences between Hdrx and Hdrx−1, and finally applying Hdrx−1⊕dhdrx to get Hdrx.

In the star topology approach, processor 212 may find a single base header and then the rest of the headers may be encoded based on the common base header. Accordingly, it may be desirable to find a base header such that the sum of the hamming distances from the base header to all other headers is minimized. After finding an appropriate base header for the star topology, denoted as Hdr1, base station 210 may then communicate the following information to endpoint 270: x, HD2, HD3, . . . , HDx, Hdr1, En2, En3, . . . , Enx. Once received, the headers may all be reconstructed from the common header Hdr1 by processor 272. For example, Hdrx may be reconstructed by first decoding dhdrx from the encoded value Enx. Then, the bit string of Hdrx can be recovered by applying Hdr1⊕dhdrx.

In the tree topology approach, processor 212 may find the minimum spanning tree wherein the parent header is used as the reference for its immediate children headers. The time complexity of finding the minimum spanning tree may be determined by Prim's algorithm. The pattern of the tree may be represented using any of a variety of known techniques such as depth first search (DFS) or breadth first search (BFS).

Regardless of the technique used to represent the tree, it may be desirable to transform the symbol representations of the tree structure into a binary representation so that it may be easily conveyed to a receiver. In other words, the symbols used to indicate a change in level or other such information about the structure of the tree may need to be represented in a binary manner for communication to endpoint 270. For example, in a depth-first approach, a '0' may represent a regular vertex (e.g., a header) and a '1' may indicate when to backtrack (e.g., when a vertex with no children is reached). In a depth-first approach, the first two bits ('0, 0') may be unnecessary as the first two bits of every depth-first binary representation will be the same (there is no backtracking within the first two bits). Accordingly, in particular embodiments, these two bits may be left out of the tree representation. In particular embodiments, the recipient may identify the end of the tree representation string upon detecting two fewer '0s' than there are headers (e.g., each header is represented by a '0' but the first two unnecessary '0s' are removed). As another example, in a breadth-first approach, a '0' may represent a regular vertex and a '1' may represent a move to the next lower level of the tree or when a vertex has no children. In particular embodiments, it may be possible to determine whether '1' means moving levels or no children by tracking and/or comparing the number of vertices in the immediately previous level and the number of '1s' and groups of '0s' in the current level. In particular embodiments, because the first two bits will always by '0, 1' they may be excluded from the binary representation of the tree. Furthermore, in particular embodiments it may be possible locate the end of the binary representation upon locating one fewer '0' than there are headers.

Once the tree structure has been represented, base station 210 may then communicate the following information to endpoint 270: x, the tree representation, hamming distances for each header with respect to its parent, the root header from which all other headers descend, the encoded value for the difference between each descendent header and its parent header.

Depending on the embodiment, additional constraints may be placed on the compression of headers. For example, certain bits in the header may be excluded from compression. For instance, in the context of 802.16e, the field of "header checksum" may be excluded from compression. In this scenario, the last eight bits in the 802.16 generic MAC header may be kept intact in the encoded delta representation. As another example of an additional constraint, the headers of concatenated packets may be divided into several groups based on a set of rules. The rules may be implemented to increase the compression efficiency when different types of headers are concatenated into a single jumbo packet. For instance, in the context of 802.16e, the cases of HT=0 (header with payload) and HT=1 (signaling header without payload) may be separated into two groups. Yet another constraint may be to require the compression ratio to be above a certain threshold before proceeding.

In some embodiments, besides compressing the headers, processor 212 may also share security information, including encryption and integrity protection, between the concatenated packets. This may be done regardless of whether or not the jumbo packet includes compressed headers. Processor 212 may reduce the overhead associated with security information by using one set of security information to protect those packets within the jumbo packet that would otherwise require one set of security information for each packet of the jumbo packet. More specifically, if there are, for example, multiple packets being concatenated that all use a common security key to encrypt/decrypt/authenticate the contents of the respective packets, then the same security key may be applied to the jumbo packet. By using only a single key, the packet overhead is reduced from multiple sets of security information to a single set of security information without any significant increase in processing requirements or reduction in security of the packets or their payload.

There may be at least two instances in which security information may be shared or reduced for a jumbo packet. The first instance occurs in single hops within a general communication system. More specifically, the packets communicated between two stations within a single hop of each other may use much, if not all, of the same security information. Thus, base station 210 may be able to concatenate the packets sent towards endpoint 270, apply the same key to the jumbo packet and use only one set of security information to protect all the concatenated packets of the jumbo packet. The second instance occurs with the use of a secure tunnel in a multi-hop relay system (e.g., the secure tunnel may pass through one or more relay stations). At the two end stations of the secure tunnel, the same key may be used to encrypt/decrypt all the packets passing through the tunnel. Therefore, that key may be shared amongst the packets of the jumbo packet being sent through the secure tunnel in multi-hop systems.

Depending on the embodiment or scenario, the security information for a packet may be the authentication data for the encrypted data packets or the authentication data for the control packets shown in plaintext. For example, in the context of 802.16, the security information for data packets in advanced encryption standard—combined cypher machine (AES-CCM, wherein CCM represents a CTR mode with CBC-MAC; CTR represents counter mode encryption; CBC represents cipher block chaining; and MAC represents message authentication code) mode may be a CMAC value while the security information for control packets may be CMAC digest or CMAC tuples. In the former case, the same CMAC value may be used to authenticate the entire payload of the jumbo packet (e.g., the relay MAC PDU in 802.16j). In the latter case, the same CMAC tuple may be applied to all the MAC management messages concatenated in the jumbo packet to authenticate all the MAC management messages.

By using a single set of security information for all the packets concatenated in the jumbo packet the overall overhead associated with communicating packets is reduced without significantly impacting security. More specifically, each jumbo packet may only need to carry one set of security information. This security information may be able to protect the jumbo packet, and thus the packets therein. Accordingly, the security of the packets within the jumbo packet is not appreciably impaired while the overhead is significantly reduced.

In particular embodiments, it may be desirable to apply an automatic repeat request (ARQ) operation to strengthen the robustness of the transmission of a long concatenated packet over, for example, a wireless link. Thus, if some blocks of data are lost, the receiver may be able to send a negative acknowledgement (NACK) back to the sender. The sender may then send the lost blocks without retransmitting all the blocks in the concatenated packets. Similarly, in certain embodiments, a hybrid ARQ (HARQ) may be included to enhance the robustness of the transmission on the wireless link at the physical PHY level.

Thus far, several different embodiments and features have been presented. Particular embodiments may combine one or more of these features depending on operational needs and/or component limitations. This may allow for great adaptability of network 200 to the needs of various organizations and users. For example, a particular embodiment may use several base stations to provide wireless access for a metropolitan area, or a single base station may be used with several relay stations to provide the necessary coverage. Furthermore, in some embodiments, base station 210 may have more or less radios. Some embodiments may include additional or different features.

Figure 4:
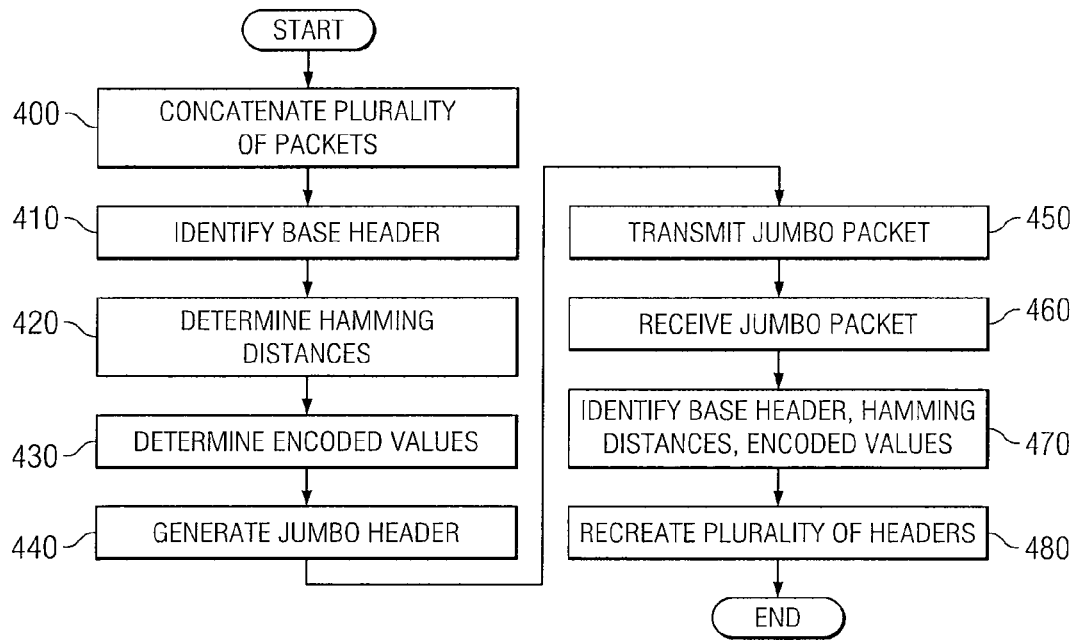
FIG. 4 illustrates a method for reducing overhead in a wireless network, in accordance with a particular embodiment.

FIG. 4 illustrates a method for reducing overhead, in accordance with particular embodiments. For purposes of simplicity for the scenario depicted in FIG. 4, it may be assumed that an endpoint is sending several packets to a base station (the same steps would apply for packets sent from the base station to the endpoint). The method begins at step 400 where a plurality of packets are concatenated into a jumbo packet. Depending on the situation, the plurality of packets may share a common destination address or may be packets intended to be sent in a single PHY burst. Depending on the situation, the packets may comprise data packets, control packets, or a combination of control and data packets. Each of the packets within the jumbo packet may have its own header.

At step 410 a base header is identified. The identified base header may be the header resulting in the greatest reduction in header overhead associated with the plurality of packets within the jumbo packet. The technique used to select the base header may vary depending on the technique used to determine the encoded values (step 430) for each of the headers. For example, where a tree structure is used, the identified base header may be the header resulting in the shortest spanning tree.

At step 420 a plurality of hamming distances are determined. In particular embodiments, the hamming distance for a particular header may be determined by comparing the respective header with the base header. In some embodiments, the hamming distance may be determined by comparing the respective header with another header of the plurality of headers in the jumbo packet. The header with which a particular header is compared may be determined, in part, based on the technique (e.g., single path, star, or tree as discussed above) being used. Regardless of the technique used, the comparison between the two headers may result in a string of bits that may be referred to as a delta header. In certain embodiments, the hamming distance may be determined by performing an exclusive-or operation and then counting the resulting instances of '1' in the respective delta header.

At step 430 a plurality of encoded values are determined. In particular embodiments, determining an encoded value may comprise first determining the delta header. Then, based on the number of bits in the respective header and the hamming distance determined, at step 420, it may be possible to determine a plurality of potential encoded values for the delta header. Each potential encoded value may be numbered, each number may be associated with a particular arrangement of bits. From among this plurality of potential encoded values an actual encoded value may be selected based on which arrangement of bits matches the arrangement of bits of the delta header.

At step 440 the jumbo header is generated. The jumbo header for the jumbo packet may include, among other things, the plurality of hamming distances determined for each of the packets at step 420, the plurality of encoded values for each of the plurality of packets determined at step 430 as well as the base header. In some embodiments, the jumbo header may also include information indicative of the tree structure. From the information in the jumbo header it may be possible to reconstruct each individual header. Thus, there is no need to also maintain the individual headers in the jumbo packet. In particular embodiments, the jumbo header may be compared to the individual headers to determine whether using the jumbo header reduces the amount of overhead compared to sending the plurality of packets with their own headers.

At step 450 the jumbo packet is transmitted by the endpoint, and at step 460 the jumbo packet is received by the base station. In particular embodiments, the jumbo packet may be transmitted/received via a wireless connection. In particular embodiments the jumbo packet may be sent via an 802.16 wireless connection. In some embodiments, the jumbo packet may be sent in a single burst.

At step 470, the base header, the hamming distances, and the encoded values associated with each of the packets are identified. If the jumbo header includes information indicative of a tree structure, then the tree structured relationship between headers may also be identified at step 470. Using the information from the jumbo header it may be possible to recreate the individual headers associated with the plurality of packets at step 480. More specifically, from the hamming distance and the encoded value, the delta header may be determined. By comparing the delta header with the appropriate decoded header, the current header may be decoded. As discussed above, the appropriate header may be the base header or one of the other headers within the jumbo packet. For example, the base header may be sent un-encoded. Then the delta header for the second header may be compared with the base header (e.g., using an exclusive-or operation) to determine the original second header; then the third header may be compared with either the base header or the known second header to determine the original third header.

Some of the steps illustrated in FIG. 4 may be combined, modified or deleted where appropriate, and additional steps may also be added to the flowchart. For example, in some embodiments the headers associated with the concatenated packets may be compressed. Additionally, steps may be performed in any suitable order without departing from the scope of particular embodiments.

Although particular embodiments have been described in detail, it should be understood that various other changes, substitutions, and alterations may be made hereto without departing from the spirit and scope of particular embodiments. For example, features and functionality discussed with respect to a particular figure, such as FIG. 2, may be used in connection with features and functionality discussed with respect to another such figure, such as FIG. 1, according to operational needs or desires. In addition, any elements may be provided as separate external components, integrated internal components, or some combination thereof, to communication system 100, network 200, or each other where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

The invention claimed is:

1. A method for reducing overhead comprising:
identifying a plurality of packets that are all to comprise at least one common piece of security information;
concatenating the plurality of packets into a single jumbo packet based on the at least one common piece of security information, each packet of the plurality of packets comprising a header;
identifying a base header from among the plurality of headers;
identifying the at least one common piece of security information;
generating a jumbo header comprising the base header;
removing the identified at least one common piece of security information from the identified plurality of packets;
applying a single set of security information to the jumbo packet, the single set of security information based on the at least one common piece of security information associated with the plurality of packets prior to the plurality of packets being concatenated into the single jumbo packet; and
transmitting the jumbo packet with the jumbo header via a wireless connection.

2. The method of claim 1, further comprising:
determining a plurality of hamming distances, each hamming distance associated with a respective packet of the plurality of packets other than the base header and indicative of a number of differences between the respective header and another header of the plurality of headers; and
determining a plurality of encoded values, each encoded value associated with a respective packet of the plurality of packets other than the base header and determined based on a difference between the respective header and at least one other header;
wherein determining a plurality of encoded values comprises, for each encoded value:
determining a delta header by comparing a plurality bits of the respective header with a plurality of bits of at least one other header of the plurality of headers;
determining a plurality of potential encoded values based on the number of bits in the respective header and the respective hamming distance;
selecting the encoded value from among the plurality of potential encoded values based on the delta header.

3. The method of claim 1, further comprising:
comparing a size of the jumbo header with a total size of the plurality of headers;
upon determining the size of the jumbo header is at least a first number of bits smaller than the total size of the plurality of headers, transmitting the jumbo packet with the jumbo header via a wireless connection; and
upon determining the total size of the plurality of headers is at most a second number of bits larger than the size of the jumbo packet, transmitting plurality of packets individually, wherein the second number is less than the first number.

4. The method of claim 2, wherein each hamming distance and each encoded value are based on the respective header and the base header.

5. The method of claim 2, wherein:
a first hamming distance and a first encoded value are based on the respective header and the base header; and
each remaining hamming distance and encoded value is based on the respective header and a previous header for which the respective hamming distance and encoded value have already been determined.

6. The method of claim 2, wherein:
a first number of hamming distances and encoded values are based on an equal number of respective headers and the base header;
each remaining hamming distance and encoded value is based on the respective header and a previous header for which the respective hamming distance and encoded value have already been determined; and
the jumbo header comprises a tree structure indicative of the other header used with a respective header in determining the respective hamming distance and the respective encoded value.

7. A method for reducing overhead comprising:
receiving, via a wireless connection, a jumbo packet comprising a jumbo header and a plurality of concatenated packets;
identifying within the jumbo header, a base header associated with one packet of the plurality of packets;
identifying a single set of security information applied to the jumbo packet, the plurality of concatenated packets without individual security information;
recovering each of the plurality of packets within the jumbo packet based on the single set of security information applied to the jumbo packet; and
recreating a plurality of headers associated with the plurality of packets based on the base header and the recovered plurality of packets.

8. The method of claim 7, wherein recreating a plurality of headers associated with the plurality of packets comprises, for each header of the plurality of headers other than the base header:
identifying at least one hamming distance and at least one encoded value associated with each packet of the plurality of packets other than the identified packet;
determining a delta header based on the hamming distance and encoded value associated with a respective header; and
comparing the delta header with the base header.

9. The method of claim 7, wherein recreating a plurality of headers associated with the plurality of packets comprises, for each header of the plurality of headers other than the base header:
identifying at least one hamming distance and at least one encoded value associated with each packet of the plurality of packets other than the identified packet;
determining a delta header based on the hamming distance and encoded value associated with a respective header; and
comparing the delta header with a previously recreated header, wherein the first comparison is made with the base header.

10. The method of claim 7, wherein recreating a plurality of headers associated with the plurality of packets comprises, for each header of the plurality of headers other than the base header:
identifying at least one hamming distance and at least one encoded value associated with each packet of the plurality of packets other than the identified packet;
determining a delta header based on the hamming distance and encoded value associated with a respective header; and
comparing the delta header with a previously recreated header, wherein:
the first comparison is made with the base header;
each subsequent comparison is made based on a tree structure included in the jumbo header.

11. A system for reducing overhead comprising:
a processor operable to:
identify a plurality of packets that are all to comprise at least one common piece of security information;
concatenate the plurality of packets into a single jumbo packet based on the at least one common piece of security information, each packet of the plurality of packets comprising a header;
identify a base header from among the plurality of headers;
identify the at least one common piece of security information;
and
generate a jumbo header comprising the base header;
remove the identified at least one common piece of security information from the identified plurality of packets;
apply a single set of security information to the jumbo packet, the single set of security information based on the at least one common piece of security information associated with the plurality of packets prior to the plurality of packets being concatenated into the single jumbo packet; and
an interface coupled to the processor and operable to transmit the jumbo packet with the jumbo header via a wireless connection.

12. The system of claim 11:
wherein the processor is further configured to:
determine a plurality of hamming distances, each hamming distance associated with a respective packet of the plurality of packets other than the base header and indicative of a number of differences between the respective header and another header of the plurality of headers; and
determine a plurality of encoded values, each encoded value associated with a respective packet of the plurality of packets other than the base header and determined based on a difference between the respective header and at least one other header; and
wherein the processor operable to determine a plurality of encoded values comprises a processor operable to, for each encoded value:
determine a delta header by comparing a plurality bits of the respective header with a plurality of bits of at least one other header of the plurality of headers;
determine a plurality of potential encoded values based on the number of bits in the respective header and the respective hamming distance;
select the encoded value from among the plurality of potential encoded values based on the delta header.

13. The system of claim 11, wherein:
the processor is further operable to compare a size of the jumbo header with a total size of the plurality of headers; and the interface is further operable to:
upon determining the size of the jumbo header is at least a first number of bits smaller than the total size of the plurality of headers, transmit the jumbo packet with the jumbo header via a wireless connection; and
upon determining the total size of the plurality of headers is at most a second number of bits larger than the size of the jumbo packet, transmit plurality of packets individually, wherein the second number is less than the first number.

14. The system of claim 12, wherein each hamming distance and each encoded value are based on the respective header and the base header.

15. The system of claim 12, wherein:
a first hamming distance and a first encoded value are based on the respective header and the base header; and
each remaining hamming distance and encoded value is based on the respective header and a previous header for which the respective hamming distance and encoded value have already been determined.

16. The system of claim 12, wherein:
a first number of hamming distances and encoded values are based on an equal number of respective headers and the base header;
each remaining hamming distance and encoded value is based on the respective header and a previous header for which the respective hamming distance and encoded value have already been determined; and
the jumbo header comprises a tree structure indicative of the other header used with a respective header in determining the respective hamming distance and the respective encoded value.

17. A system for reducing overhead comprising:
an interface operable to receive, via a wireless connection, a jumbo packet comprising a jumbo header and a plurality of concatenated packets; and
a processor coupled to the interface and operable to:
identify within the jumbo header, a base header associated with one packet of the plurality of packets;
identify a single set of security information applied to the jumbo packet, the plurality of concatenated packets without individual security information;
recover each of the plurality of packets within the jumbo packet based on the single set of security information applied to the jumbo packet; and
recreate a plurality of headers associated with the plurality of packets based on the base header and the recovered plurality of packets.

18. The system of claim 17, wherein the processor operable to recreate a plurality of headers associated with the plurality of packets comprises a processor operable to, for each header of the plurality of headers other than the base header:
identify at least one hamming distance and at least one encoded value associated with each packet of the plurality of packets other than the identified packet;
determine a delta header based on the hamming distance and encoded value associated with a respective header; and
compare the delta header with the base header.

19. The system of claim 17, wherein the processor operable to recreate a plurality of headers associated with the plurality of packets comprises a processor operable to, for each header of the plurality of headers other than the base header:
identify at least one hamming distance and at least one encoded value associated with each packet of the plurality of packets other than the identified packet;
determine a delta header based on the hamming distance and encoded value associated with a respective header; and
compare the delta header with a previously recreated header, wherein the first comparison is made with the base header.

20. The system of claim 17, wherein the processor operable to recreate a plurality of headers associated with the plurality of packets comprises a processor operable to, for each header of the plurality of headers other than the base header:
identify at least one hamming distance and at least one encoded value associated with each packet of the plurality of packets other than the identified packet;
determine a delta header based on the hamming distance and encoded value associated with a respective header; and
compare the delta header with a previously recreated header, wherein:
the first comparison is made with the base header;
each subsequent comparison is made based on a tree structure included in the jumbo header.

* * * * *